Figure 1:
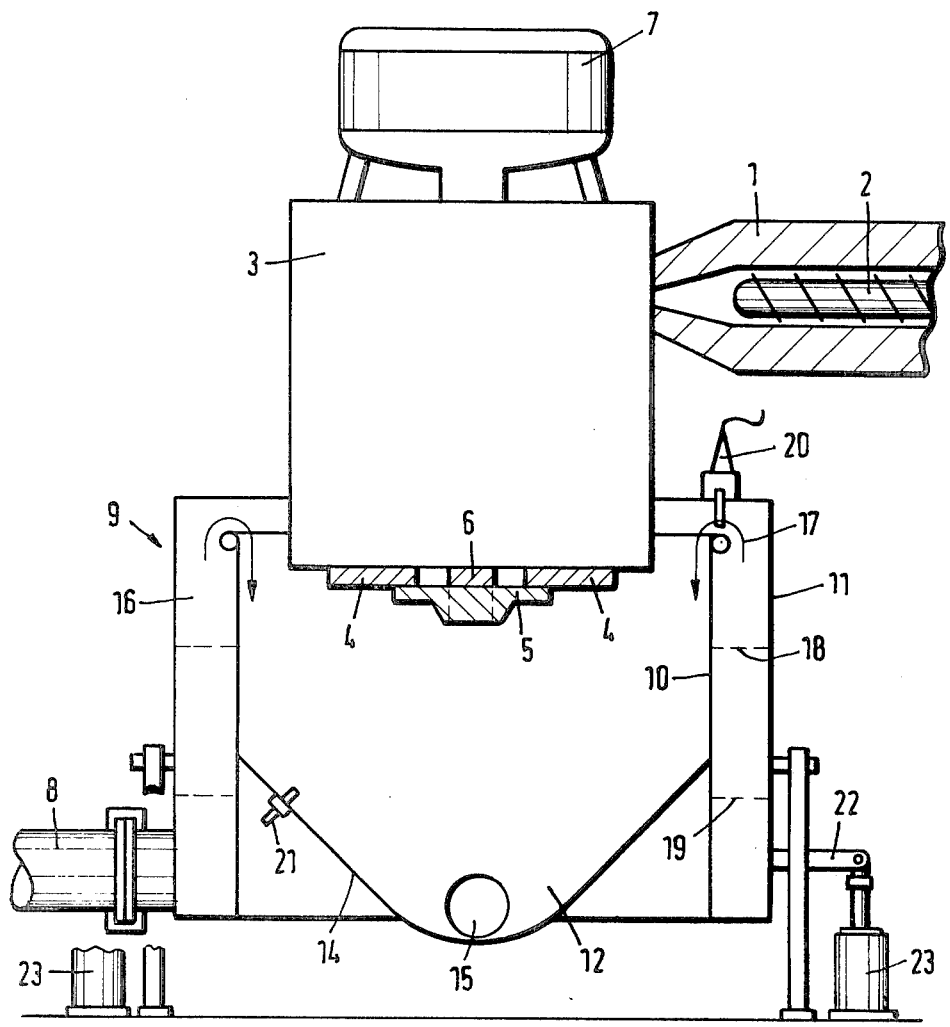

United States Patent [19]

Anders

[11] 4,245,972
[45] Jan. 20, 1981

[54] GRANULATING APPARATUS

[75] Inventor: Dietmar Anders, Hannover, Fed. Rep. of Germany

[73] Assignee: Hermann Berstorff Maschinenbau GmbH, Hannover Kleefeld, Fed. Rep. of Germany

[21] Appl. No.: 48,761

[22] Filed: Jun. 14, 1979

[51] Int. Cl.³ .................... B29D 7/02; B28B 3/20
[52] U.S. Cl. ........................... 425/67; 264/142;
425/69; 425/136; 425/144; 425/313
[58] Field of Search ............ 425/313, 67, 69, 136, 425/144; 264/142

[56] References Cited

U.S. PATENT DOCUMENTS

| 2,850,764 | 9/1958 | Evans et al. | 425/313 |
|---|---|---|---|
| 3,341,892 | 9/1967 | Mayner | 425/313 |
| 3,343,213 | 9/1967 | Fritsch | 425/313 |
| 3,431,336 | 3/1969 | Isobe et al. | 264/169 |
| 3,664,782 | 5/1972 | Nevin | 264/178 F |
| 4,038,002 | 7/1977 | Inaba et al. | 425/313 |

FOREIGN PATENT DOCUMENTS

| 1454888 | 9/1971 | Fed. Rep. of Germany. | |
| 1679803 | 12/1972 | Fed. Rep. of Germany. | |
| 2035035 | 1/1973 | Fed. Rep. of Germany. | |
| 1377421 | 12/1964 | France | 425/313 |
| 636420 | 3/1962 | Italy | 425/313 |
| 552202 | 4/1977 | U.S.S.R. | 425/313 |

Primary Examiner—Jay H. Woo
Attorney, Agent, or Firm—Schwartz, Jeffery, Schwaab, Mack, Blumenthal & Koch

[57] ABSTRACT

Granulating apparatus, for plastics melt and other materials comprising an extruder head with a perforated member, a rotating cutter to cut material extruded through the perforated member, a housing surrounding the cutter and forming a granulating chamber with a generally upright axis and liquid supply means to supply cooling liquid to the top edge of the granulating chamber so that the cooling liquid flows in a film over the inner wall of the housing of the granulating chamber to prevent the cut material from sticking to said inner wall and to cool the cut material. The liquid supply means may include a perforated pipe encircling the granulating chamber or a weir at the inner edge of an annular chamber.

5 Claims, 2 Drawing Figures

GRANULATING APPARATUS

The invention relates to apparatus for granulating plastics melt and similar materials.

Apparatus for this purpose has been previously proposed, comprising an extruder with a perforated member and a rotating cutter disposed coaxially in front of the extruder head, the cutters being surrounded by a granulating chamber which is associated with the extruder head and has cooling liquid flowing through it.

A granulator of this kind is disclosed in German patent specification No. 1679803, which has a water inlet, for cooling the granules chopped off by the blades of the cutter, extending from above, centrally through the extruder head, the water flowing onto a guide which deflects the water radially into the cutting plane. The radial deflection of the centrally introduced cooling water cannot prevent the cooling water from coming into contact with the perforated plate, causing the plate to be cooled and the plastics to stick to it. When cooling water comes into contact with the perforated plate there is a so called "frosting over" of the plate, that is to say, the holes become clogged with the cooled and solidifying plastics.

It has been proposed in German patent specification No. 1 454 888 to force a cooling liquid against gravity into an annular, horizontally arranged granulator housing, in order to cover an annular inner shell of the granulator housing with a film of water. If a thick enough film of water is to be obtained on the inside of the housing, the cooling liquid has to be forced into the granulator housing against gravity at a high pressure. This involves considerable expenditure on energy and in addition can only be applied to granulators with a relatively small output.

As a means of avoiding these disadvantages, it has been proposed in German patent specification No. 2 035 035 that a horizontally disposed, cylindrical granulator housing should be rotatable about its longitudinal axis, so that less pressure and thus lower energy costs are required to produce the film of cooling water on the inner wall of the housing to carry away the granules and prevent them from caking. Extra costs are incurred through the additional drive for rotating the housing. However, the greatest disadvantage is that with this construction too the cooling water comes into contact with the perforated plate of the extruder head, leading to frosting of the plate and thus total stoppages of the operation.

The invention has among its objects to provide a granulator which can give a very high output and in which there will be no agglomeration of the granules chopped off.

A further object is to ensure that the perforated plate does not frost over and thus become clogged by cooling, and that the operative state of the granulator is monitored and maintained.

According to the invention there is provided apparatus for granulating plastics melt and similar materials, comprising an extruder head with a perforated member through which material to be granulated can be extruded, a rotating cutter disposed in front of the extruder head, a housing surrounding the cutter and forming a granulating chamber, the granulating chamber having a generally upright axis, and cooling liquid supply means to supply cooling liquid to the top edge of the housing of the granulating chamber so that the cooling liquid flows in a film over the inner wall of the housing of the granulating chamber.

By having the cooling liquid supply means discharging the cooling liquid at the top edge, around the periphery of the housing of the granulating chamber, e.g. in the form of a pipe running round the top edge and provided at the bottom with apertures in the form of longitudinal slits to let out the cooling water, it can be ensured that the inside of the housing will be permanently covered with a film of cooling liquid, and the thickness of the film can be varied according to the dimensions of the granules and/or the output of the granulator, by inroducing more or less cooling liquid.

In another example the cooling liquid is fed into an annular chamber formed between the outer wall of the housing and a cylindrical inner shell of the granulating chamber. Here the cooling liquid rises until it pours over a weir at the top edge of the inner shell and covers it with a film of cooling liquid. If material is being granulated into this chamber the granules, which have a radial motion imparted to them by the cutter, will land on the inner shell covered with the film of cooling liquid, and will thus be conveyed to the bottom of the granulating chamber, from which they will emerge through an outlet.

Since the quantity of cooling liquid fed into the annular chamber between the inner and outer shells of the granulating housing can be increased at will, the granulator can be adapted to almost any output; as the speed at which the film of liquid flows over the inner shell is increased, more granules are carried away, without any individual granules touching one another and thus sticking together as they strike the film.

As a means of ensuring that the cooling liquid introduced into the granulating housing, when fed through the annular cavity, will pour over the top edge of the inner shell with an even speed of flow and will wet the inside of the shell with a layer of liquid of even thickness, resistance elements to equalise the flow are provided in the annular chamber between the inner shell and the outer housing, in the form of an annular plate with rows of holes therein. These prevent any eddies from forming in the annular chamber and ensure that the cooling medium pours evenly over the top of the inner shell.

Preferably the flow of cooling liquid out of the supply means provided for the purpose at the top edge of the granulator housing is monitored, to ensure that there is always a film of liquid on the inner face of the housing. For this purpose sensing means of known kind is provided in the immediate vicinity of the means discharging the cooling liquid. When there is a lack of cooling liquid the sensing means acts through control means to switch off the granulator and/or extruder, thereby effectively preventing the inner wall from becoming caked with plastics.

The outflow of cooling liquid with the chopped up granules can be monitored by an outlet sensing means, which ensures that the granulator and/or extruder is switched off if the outflow pipe should become blocked.

Figure 2:
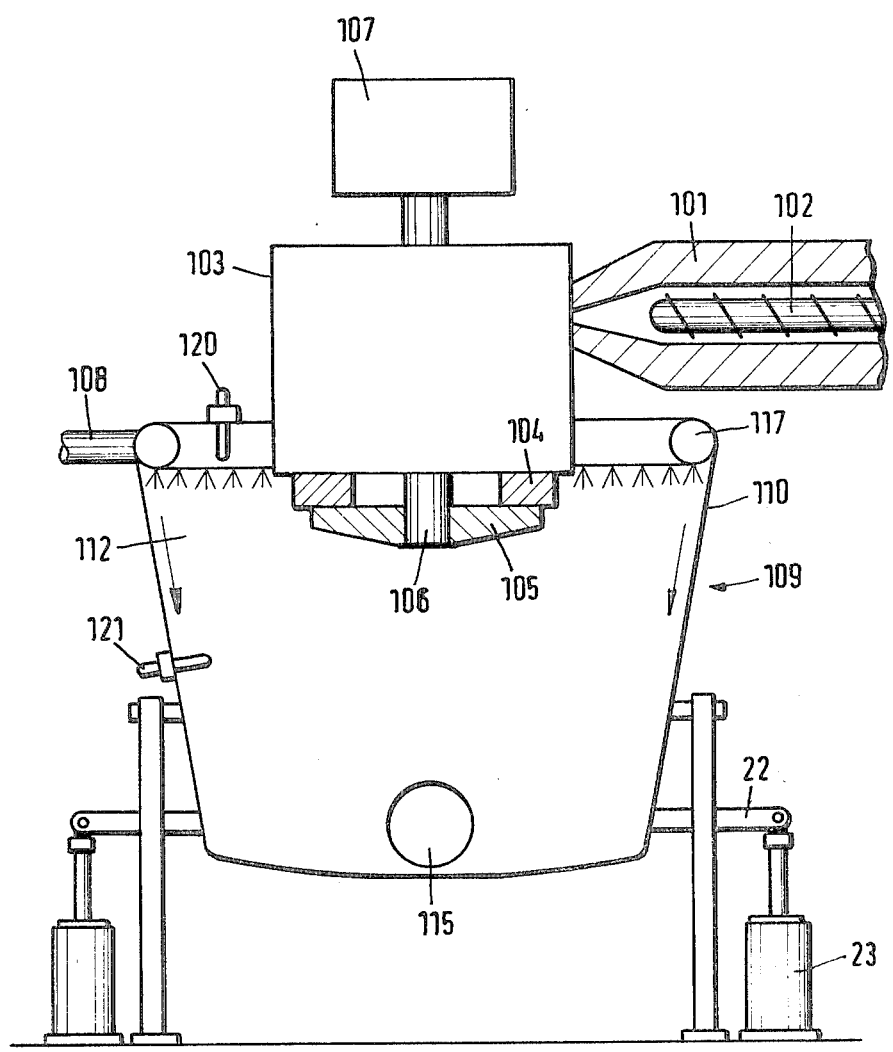

The invention is diagrammatically illustrated by way of example in the accompanying drawings, in which:

FIG. 1 shows a first embodiment of granulating apparatus according to the invention with a multiple-walled granulating chamber; and FIG. 2 shows a second embodiment of granulating apparatus according to the invention with a single-walled granulating chamber.

Referring to the drawings and firstly to FIG. 1, plastics material is conveyed into a deflecting extruder head 3 from an extruder 1 having a worm 2. The head 3 has a perforated disc (not shown) at its underside, with cutters 4 running directly across it. The cutters 4 are held by a support 5 mounted on a cutter shaft 6. The shaft 6 passes through the deflecting head 3 and is driven by a motor 7. A cooling liquid is supplied to a granulator housing 9 through an inlet 8. The housing 9 comprises an outer shell 11 and an inner shell 10, the inner shell being disposed within the outer shell 11 and defining a granulating chamber 12. The inner shell 10 is smaller in diameter than the outer shell 11 and open at the top, so that the cooling liquid which enters through the inlet 8 pours over a weir formed by the upper edge of the inner shell 10 as indicated at 17 and thus forms a film of cooling liquid on the inside of the inner shell 10.

The plastics which is conveyed into the deflecting head 3 by the worm 2 of the extruder 1 passes through a system of distributing passages (not shown) to the perforated disc (not shown), through which it is extruded in strand form. Immediately on leaving the perforated disc the strands are chopped into granules by the revolving cutters 4. The paths of travel of the individual granules from the perforated disc to the film of water on the inner shell 10 do not intersect, and the overflowing coolant which forms the film of liquid, preferably water, rapidly carriers away the granules to a coolant outlet 15. Individual granular particles are thus prevented from clinging together.

The construction illustrated has the particular advantage that the coolant, which is necessary to cool the granules and which prevents the individual particles from caking, does not come into contact with the perforated disc from which the individual strands are emerging. This is an effective way of preventing the perforated disc from being cooled by the cooling liquid and the plastics, which is cured by the cooling liquid, from being deposited in the holes, which would lead to clogging and total breakdown of the granulating function.

Resistance elements 18, 19 to equalise the flow are located in the annular chamber 16. They may each, for example, have rows of holes in a horizontally disposed annular plate.

Pneumatic cylinders 23 cooperating with rods and levers 22 may be provided to adjust the relative position of the granulating chamber 9 and the extruder head.

Referring to FIG. 2, a single-walled granulating housing 109 has a pipe 117 disposed at its upper edge and extending around its periphery, with apertures (not shown) formed in the pipe and directed towards the inner face of a wall 110 of the housing 109. Coolant passes through an inlet pipe 108 into the annular pipe 117 and runs through said apertures and down the inner face of the wall 110 of the granulating housing 109.

The material to be granulated is conveyed into a deflecting head 103 by an extruder 101 having a worm 102, and leaves the head 103 through an annular disc (not shown) with rows of holes formed in it. Immediatelyy after the strands energe from the rows of holes they are chopped into individual granules by rotating cutters 104, which are driven by a motor 107 by way of a shaft 106. The cutters 104 impart a radially outward movement to the granules, so that they impinge on a film of water running down the inner face of the wall 110. The water conveys the granules to a coolant outlet 115 disposed at the bottom of the housing 109.

In the immediate vicinity of the pipe 117 discharging the coolant, or of the weir formed by the overflow edge 17 of the inner shell in the embodiment of FIG. 1, there is a sensing means 120 or 20 respectively to monitor the flow of cooling water. This switches off the granulator or the extruder 1, 101 by means of a control device (not shown), should the supply of coolant be interrupted or should the thickness of the film of coolant drop below a predetermined limit, thereby preventing the granules being chopped off from landing on and sticking to parts of the granulator which are not wetted with cooling water.

An additional sensing means 21 or 121 indicates when the coolant outflow pipe 15, 115 is blocked. When the level of cooling water in the granulating chamber 12, 112 rises beyond an admissible level, the sensing means 21, 121 acts through control devices (not shown) to switch off the granulator or the extruder 1. This avoids having the whole granulating function put into question by blockage of the coolant outlet 15, 115.

The housing of the granulator 9, 109 illustrated in the drawings is cylindrical. However, the granulator housing could be rectangular, hexagonal or of other form if desired.

What is claimed is:

1. Apparatus for granulating plastics melt and similar materials, comprising:
   (a) an extruder head through which material to be extruded is passed,
   (b) a rotating cutter disposed in front of said cutter head for cutting said plastics material into granules,
   (c) a housing surrounding said cutter and including an outer shell and a spaced, cylindrical inner shell which forms a granulating chamber, said inner shell being smaller in diameter than said outer shell thereby to form an annular chamber open at its upper end between said shells, and being smaller in height than said outer shell thereby to form a weir extending around said granulating chamber at the upper end thereof;
   (d) cooling liquid supply means communicating with said annular chamber for supplying cooling liquid thereto, and
   (e) outlet means in said granulating chamber for removing therefrom the cooled granules and cooling liquid,
   whereby cooling liquid admitted to said annular chamber between said outer and inner shells can be directed into said granulating chamber overr said weir to form a film over the inner surface of said inner shell, said granules thus formed contacting said film of cooling liquid to cool said granules and prevent said granules from sticking together, said film constitutiong the sole means of coolant contact for said granules.

2. The apparatus of claim 1 further including resistance means in said annular chamber to equalize the flow of cooling liquid over said weir, said resistance means comprising an annular plate formed with openings upwardly through which said cooling liquid passes.

3. The apparatus of claims 1 or 2 further including means for vertically moving said granulating chamber relative to said extruder head.

4. The apparatus of claim 1 further including sensing means to monitor the outflow of cooling liquid and disposed in the immediate vicinity of said cooling liquid supply means, said sensing means acting through control means to switch off the apparatus if it senses a lack of cooling liquid.

5. The apparatus of claim 1 further including outlet sensing means to monitor outflow of granulated material and cooling liquid from said granulating chamber, said outlet sensing means, if activated, acting through control means to switch off said apparatus.

* * * * *